US006402333B2

(12) United States Patent
Gilmer

(10) Patent No.: US 6,402,333 B2
(45) Date of Patent: Jun. 11, 2002

(54) APPLIANCE LIGHTING DEVICE

(76) Inventor: Jan C. Gilmer, P.O. Box 400, Howard Lake, MN (US) 55349

(*) Notice: Subject to any disclaimer, the term of this patent is extended or adjusted under 35 U.S.C. 154(b) by 0 days.

(21) Appl. No.: 09/745,500

(22) Filed: Dec. 22, 2000

Related U.S. Application Data

(63) Continuation-in-part of application No. 09/301,850, filed on Apr. 29, 1999, now Pat. No. 6,193,382.

(51) Int. Cl.[7] .......... G01D 11/28

(52) U.S. Cl. .......... 362/23; 362/186; 362/190; 362/359

(58) Field of Search .......... 362/23–25, 28–30, 362/85, 89–92, 109, 186, 190, 208, 376, 378, 359

(56) References Cited

U.S. PATENT DOCUMENTS

| | | | | | |
|---|---|---|---|---|---|
| 4,887,189 | A | * | 12/1989 | Garrett | 362/23 |
| 4,895,455 | A | | 1/1990 | Horning | 374/208 |
| 5,113,318 | A | | 5/1992 | Conley | 362/23 |
| 5,188,448 | A | * | 2/1993 | Siriani et al. | 362/109 |
| 5,325,278 | A | * | 6/1994 | Tortola et al. | 362/28 |
| 5,491,615 | A | | 2/1996 | Nichols | 362/23 |
| 5,683,350 | A | | 11/1997 | Paul et al. | 362/186 |
| 6,019,480 | A | * | 2/2000 | Polkow | 362/23 |
| 6,086,223 | A | * | 7/2000 | Fogle et al. | 362/23 |

* cited by examiner

*Primary Examiner*—Alan Cariaso
(74) *Attorney, Agent, or Firm*—Anthony G. Eggink

(57) ABSTRACT

A lighting device for momentarily providing light to an appliance to which it is mounted. The lighting device has a nonconductive base structure adapted to be mounted onto the appliance or to be incorporated into the appliance or other appliance engaging structure. The base structure has a cavity, a retaining slot and apertures into which a battery, a light bulb and a conductive connector structure are placed. The conductive connector structure has a switch which extends from the base structure and through the exterior cover. The cover is constructed to receive the base structure and has a forwardly extending hood which is adapted to direct light to the appliance. Various mounting structures are provided for attaching the lighting device to an appliance or other objects.

27 Claims, 17 Drawing Sheets

APPLIANCE LIGHTING DEVICE

This application is a Continuation in Part Application of U.S. patent application Ser. No. 09/301,850 filed on Apr. 29, 1999 now U.S. Pat. No. 6,193,382.

BACKGROUND OF THE INVENTION

This invention relates generally to lighting devices. More particularly, this invention relates to lighting devices for temporarily providing light to appliances, such as thermostats, VCR's, telephone caller ID's and the like as well as to provide light to designated areas and for use as a portable light source. Further, this invention relates to lighting devices having attachment and mounting structures for positioning a lighting device for use with various appliances.

Electrical and electronic appliances are often difficult to read and, therefore, to properly set and control. For example, thermostats for furnace and air conditioning units are typically placed in areas, such as in a corner of a room or in hallways, and which are often not well lighted. Thermostat controls are usually adjusted at night when natural lighting is not available. Thus, home owners often have a difficult time reading and adjusting thermostats. This problem is compounded for the elderly and to those having eyesight difficulties whom may need a flashlight, a match, a lighter or may need to light an adjoining space to make a thermostat reading and adjustment. The latter use of electrical energy, often involving 110 volts/100 watts or more, represents a high consumption of energy despite the world wide attempt to conserve electrical energy use. The lighting device of this invention provides an energy efficient means to momentarily illuminate a thermostat.

Various electrical appliances and/or controls for such appliances are used in households as well as in other settings. Often times, such appliances or controls require periodic monitoring or setting. For purposes of this patent application, a thermostat will be discussed and particularly, the lighting device of the present invention is constructed and arranged to provide a momentary light for a thermostat.

Despite the need for an economical, versatile, efficient and functional device to aid the reading and operation of electrical appliances, such as thermostats, none as far as is known has been commercialized. For example, U.S. Pat. No. 4,895,455 to Horning discloses a cover for a wall mounted thermostat having illumination and magnifying means, however, the components are mounted beneath the cover in the interior of the thermostat itself. U.S. Pat. No. 5,113,318 to Conley also discloses a thermostat light, however, the U-shaped device of this invention is bulky and limited in use with certain appliance designs. U.S. Pat. No. 5,491,615 to Nichols discloses a light attachment for a thermostat which includes a pivotally mounted telescoping arm. These prior art references disclose generally complex lighting devices which are limited in use and which are particularly difficult to adapt to existing thermostats.

It is an object of the present invention to provide a lighting device which is economical, efficient and constructed and arranged to be adapted on a variety of existing thermostat designs as well as other electrical and electronic appliances. The lighting device of the present invention provides a lighting unit which can be added to existing appliances or which can be incorporated into the original design and construction of the electrical or electric appliance to be illuminated.

It is another object to provide lighting structures having slip-in lighting modules comprising the bulb, energy source and switch. The slip-in module body may be used for a variety of lighting device structures and enables the lighting devices to be easily assembled and serviced when necessary. It is another object to provide lighting structures having a hood or cover adapted to provide light onto predetermined areas of a thermostat, appliance or selected area and the cover is constructed and arranged to receive the lighting module which permits the bulb and battery, for example, to be easily replaced.

It is another object to provide light unit structures integral with an annular cover or housing adapted to fit onto thermostats or other structures. Light unit structures are also provided for placement onto flat, round or any contoured surfaces of an appliance, for example, and having means for securing the lighting structure onto such surfaces of thermostats and other appliances. Removable light structures are also provided for use in emergency lighting situations when electrical power is disrupted, for example. Further, light structures are provided to be adapted for mounting on a door plate to illuminate the door entry and door handle areas. Other lighting structures are designed for multiple use, such as for various thermostat designs, emergency use, and mounting to locations, such as doors. Other lighting devices are provided which are adjustable, attachable and/or removable from an appliance, and which have various attachment and mounting means for providing a lighting structure to, on or in proximity to an appliance.

SUMMARY OF THE INVENTION

The lighting device of the present invention is comprised of a self contained base and hood structure which is mountable to an existing electrical appliance or which can be incorporated into the design and construction of the electrical appliance itself. When used with a thermostat, for example, the lighting device may be mounted onto the top of the thermostat cover or housing or it may be manufactured and sold as a device with a decorative thermostat cover and wherein the original thermostat ring is replaced by the decorative cover with integral lighting device, or wherein the decorative cover with light unit is mounted over an existing thermostat or similar appliance. The lighting devices may also be used in other applications as will be further described.

The lighting device may be comprised of a self contained base structure which is adapted to be mounted to an electrical appliance or which may be constructed and arranged to frictionally fit into a hood or cover structure. The base structure has a cavity into which a battery, a light bulb and a conductive connector member with a switch is mounted. The switch, which is preferably of the momentary push down type, is connected for operation between the battery and the light bulb and is accessible outside the base structure and cover. The base structure may be provided with connecting means which permit the lighting device to be attached to the thermostat. The base structure may be flat or contoured to be aesthetically and securely mounted to the top of a thermostat or other appliance. A pair of opposing snap ridges may be utilized for this purpose, however, a fastener such as a screw or the like, an adhesive or adhesive layer with release liner may also be used for mounting the base structure to a thermostat.

A cover or hood is provided to receive the self contained base structure. The cover may also be mounted over the base structure. The base structure may be used with and placed into various cover structures and designs. The cover has a forward extending hood area which is adapted to direct the light from the light bulb to the area to be illuminated. The cover has an aperture or slot through which the switch is accessible for operation. The base structure contains a lighting module comprised of various components including, for example, a light bulb, a battery or batteries, a switch and a conductive connector member structure which communicate between these components. The base structure preferably slips into the cover and, preferably, is frictionally held therein. The base structure of the lighting device is constructed and arranged in a unique manner which provides an economical means to securely and effectively hold and interconnect these components in a unitary and self contained manner. The cover structure of the invention may also have various structures and designs including depending ring-like members whereby the cover is provided with means to frictionally receive the lighting module and the ring-like member is adapted to be mounted over appliances such as thermostats and door plates, for example. The cover structures may be decorative and adapted to receive informational or advertising materials.

Lighting devices are provided in this invention having various attachment and mounting structures for positioning a lighting device for use with appliances, such as thermostats.

These and other benefits of this invention will become clear from the following description by reference to the drawings.

DESCRIPTION OF THE PREFERRED EMBODIMENTS

The present invention relates to lighting devices for providing momentary lighting to specified areas, such as electrical and electronic appliances as well as other areas requiring illumination. The lighting devices of this invention are useful for those users having difficulty reading an appliance, such as a thermostat, for example. Thermostats are typically placed in dark areas such as hallways, which make them difficult to read and operate and particularly for the elderly or those having visual impairment. Although the lighting devices will be primarily discussed with respect to thermostats to control furnaces and air conditioning units, the lighting devices are also useful with other electric and electronic appliances such as VCR's, telephone caller ID's and the like as well as other areas. The teachings of this invention are also applicable to lighting devices that may be removable or used with or incorporated into other apparatus, for example, used to illuminate any desired location or area. Further, the lighting devices may have various attachment structures including cooperating mounting structures. The lighting device attachment and mounting structures may be adjustable and movable and may be incorporated into the appliance structures.

Existing thermostats are sold and utilized having various structures. For example, a thermostat structure may include a wall mount base plate, a subbase, a main base, a thermostat cover body, and various styles of wall cover-up plates to which the latter base members may be attached. The lighting devices of this invention may be incorporated or connected to any of these thermostat structure components.

Figure 1:
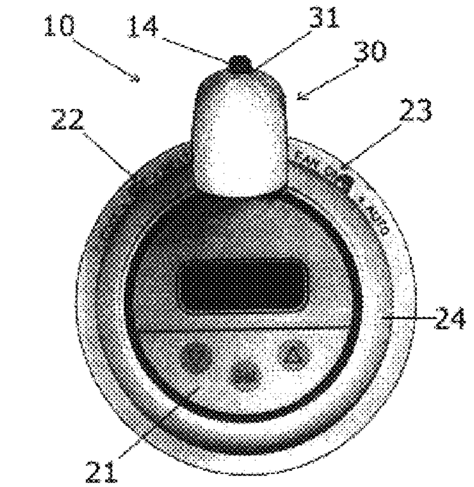
FIG. 1 is a front view of the lighting device mounted on a thermostat.

FIG. 1 is a front view of lighting device 10 shown mounted on top of thermostat 21. The thermostat 21 shown is a digital, programmable thermostat sold by Honeywell and which has a heat/cool setting 22 on its backplate as well as a fan setting 23. Thermostat 21 has a cover ring 24 which is generally not easily removed from the thermostat structure. The lighting device 10 is shown mounted to the top of the existing thermostat ring 24. The device 10 has a hood 30 which has a body design that does not impede the flow of air through the air channels of the thermostat 21. Hood 30 is further shown having a switch 14 extending through aperture 31.

The lighting device 10 is a compact self contained and adaptable unit. The lighting device 10 has an internal lighting structure or module positioned beneath hood 30. The internal lighting structure is comprised of a base structure, a light bulb, power means, such as batteries, and a switch mechanism. The internal lighting structure may have various embodiments as will be described.

Figure 2:
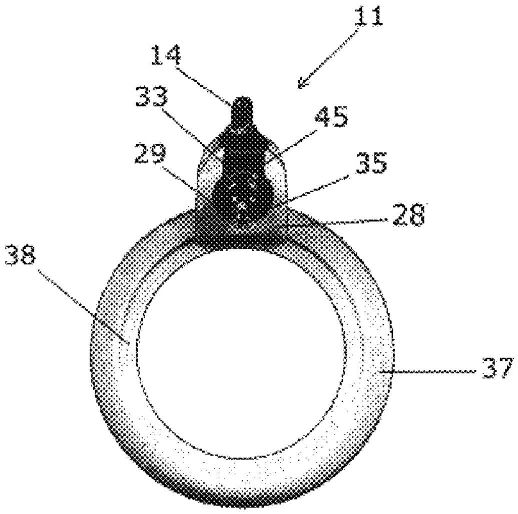
FIG. 2 is a front view showing the base structure of the lighting device mounted on a thermostat cover.

FIG. 2 is a front view showing the base structure 28 of lighting module 11 of lighting device 10 mounted on ring portion or attachment member 37 which, as a unit with the lighting device 10 is adapted to surround a thermostat. The ring portion 37 is a replaceable ring member for mounting on a thermostat and it is provided with a recessed inner ring portion 38. A conductive connector member 33 is mounted in the base structure 28 and the light bulb 29 extends outwardly through the front opening 35. A switch 14 extends upwardly from the conductive connector member 33. The conductive connector member 33 is secured within slot 36 and extends rearward and covers aperture 34 within base structure 28 wherein a battery is placed. The light bulb 29 is threaded into a socket area 45 of the conductive connector member 33 and extends above and outward from the ring 37. Contact by the conductive connector member 33 to the battery by means of pushing down the switch 14 completes the electrical circuit and causes light bulb 29 to illuminate. The light bulb 29 is positioned within the hood 30 so that when the switch 14 is activated, the readout and control areas of a thermostat are illuminated. Although various switches may be used within the purview of this invention, it is preferred that a momentary, hold down switch 14 be used. Thus, when illumination is desired, the switch 14 is merely pressed down and when the switch 14 is released, the light device is again in the off position. The momentary, hold down switch conserves both battery and bulb life by preventing the inadvertent continuous activation of the lighting device.

Figure 3:
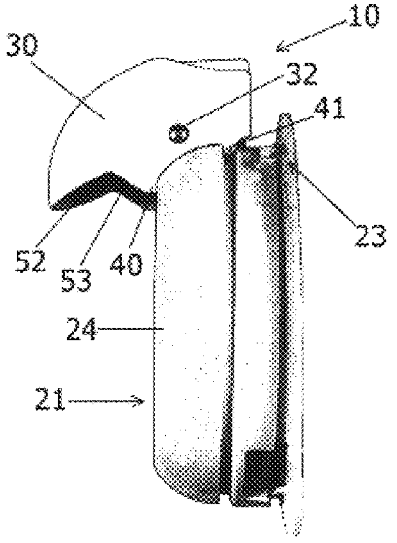
FIG. 3 is a side view of the lighting device of FIG. 1.

Referring to FIG. 3, the hood or cover 30 is shown to fit over the base structure 28 which holds the electrical components. The exterior cover 30 has a front sloping portion 52 and is preferably molded of a rigid or semi-rigid unbreakable material including plastic compositions. For example, a material such as Lexan® or the like may be used and other thermoplastic or thermosetting compositions may also be used to mold the lighting devices of the invention. Cover 30 is shown to have a bottom peripheral shape to match that of the base structure 28. The cover 30 is shown to have front lips 40 and rear lips 41 which align with the opposing snap on ridges 42 and 43 of base structure 28. Upon securing the cover 30 to base 28, the lips 40 and 41 align and cover the sides of ridges 42 and 43 for aesthetic purposes. The cover

30 may have an aperture to allow a fastener, such as a screw or the like, to secure cover 30 to base structure 28. The cover 30 has an aperture 31 for switch 14. Other means for securing the light module into the hooded cover of the lighting device will be further described.

Figure 4:
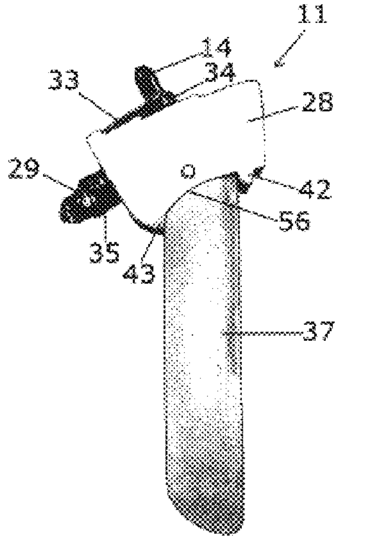
FIG. 4 is a side view of the mounted base structure of FIG. 2.

FIGS. 2 and 4 show base structure 28 mounted to ring 37 which is constructed and arranged as a replacement cover ring for use on circular thermostats. Base member 28 is shown mounted to ring 37, however, as will be further described, various methods and structures may be used to mount the lighting device 10 to a thermostat. Essentially, the method and structure is dependent upon whether the light device 10 is an aftermarket item, whether it is incorporated with a replacement thermostat ring structure and whether the ring of the thermostat is removable. FIG. 4 shows the front ridge 43 and rear ridge 42 snapped over the thermostat ring 37. The bottom 56 of base structure 28 is shown having the contour of thermostat ring 37. Light bulb 29 extends from opening 35 of base structure 28 and connective conductor member 33, and switch 14 extends from aperture 34 of base structure 28.

FIG. 3 shows cover 30 held over base structure 28 by threaded fastener 32 and the lighting device 10 mounted to thermostat ring 24 of a thermostat. The thermostat ring 24 is part of the thermostat and thus, light device 10 is mounted to thermostat ring 24 of the thermostat. The cover 30 is shown to have a forward sloping hood portion 52. A rearward sloping portion 53 extends downwardly toward the thermostat ring 24. This forward hood of cover 30 configuration in conjunction with a reflective interior surface of the cover, for example, directs light toward the front of the thermostat for reading and control purposes. The curvature of the hood of cover 30 provides a reflective light for illuminating the reading and control area of the thermostat. As shown, the cover 30 is curved along its length as well as in the direction perpendicular to its length. The curved forward end of the hood may be hemispherical in shape having a diameter of approximately 0.75 inches, for example.

Although the lighting device of the present invention has been shown and described for use with circular cover ring having a curved periphery, the lighting device may also be used on flat or other contoured surfaces or structures. For example, rectangular thermostats, VCR's, telephone caller ID units and other appliances, may have flat or contoured mounting surfaces. In the latter cases, the base 28 may be flat or contoured to mate with the appliance surface on which it is mounted and then is positioned at the peripheral edge of the electrical or electronic appliance. The cover 30 extends over the forward edge of the base member 28 and directs light to the operating or readout portion of the appliance.

Figure 5:
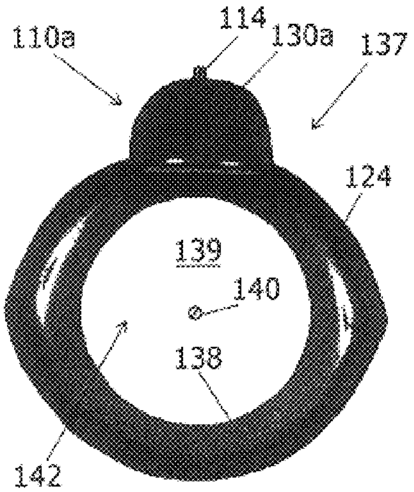
FIG. 5 is a front view of a unitary molded lighting device of the invention.
Figure 6:
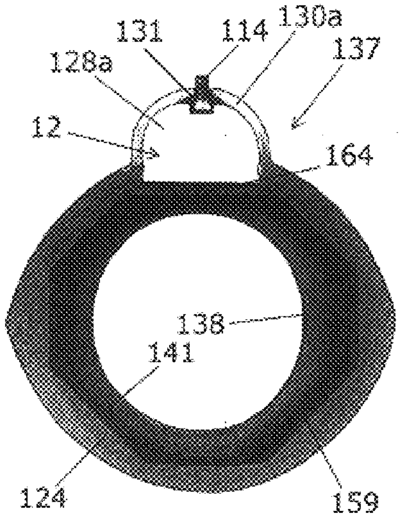
FIG. 6 is a rear view of the embodiment of FIG. 5.

FIGS. 5 and 6 show front and back views of a unitary molded lighting device structure 137 including a cover structure 110(*a*) connected to a ring-like cover portion 124 with an inner opening 138. Base structure 128(*a*) slides into cover 130(*a*) above bottom ridge area 164. Inner opening 138 is shown to have a 24 sided aperture and the rear opening 159 is shown to be an eight sided polygon which frictionally engages a circular mounting structure. Other opening and rear mounting configurations may be used according to this invention. Embodiment 137 is shown and described to be used to replace an existing thermostat cover and to provide a more aesthetically pleasing and functional lighting device for a thermostat, however, other uses are also anticipated.

A mounting plate and cover retainer structure 139 is shown in FIG. 5. The mounting structure 139, for example, may comprise a circular disc that is fastened to a door or wall by means of screws. The mounting structure 139 may have a centrally disposed spacer which projects the disc from the wall to thereby allow the lighting device to be mounted over the plate by means of cover retainer and screw 140 which engages the centrally disposed spacer of the mounting plate. An informational button 142 may be inserted into the inner opening 138, and which when retained may cover the opening edge 138. As shown in FIG. 6, the dotted circle 141 represents the peripheral edge of the mounting plate 139, or of a circular thermostat and which frictionally fits into the rear opening 159 (polygon walls) of the depending cover structure 124. The lighting device portion 110(*a*) directs light downwardly onto a door area, for example, may illuminate informational or advertising materials 142 placed on mounting plate 139. As discussed, the lighting and cover device 137 may be easily removed from a thermostat and utilized by a user for emergency purposes.

In summary, the molded lighting device embodiment 137, shown in FIGS. 5 and 6, as well as the other lighting device structures of this invention having a ring structure extending from the light cover, i.e. FIGS. 2, 4–16 and 20–35, all may be used in a variety of settings and for a variety of purposes. The use of these lighting device embodiments in connection with an adapter or mounting structure on a door or in a door entry area being one of such uses.

Figure 7:
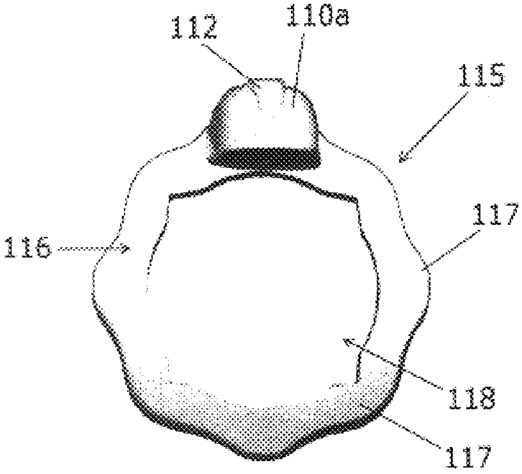
FIG. 7 is a front view showing another embodiment of the unitary molded lighting device of the invention.
Figure 8:
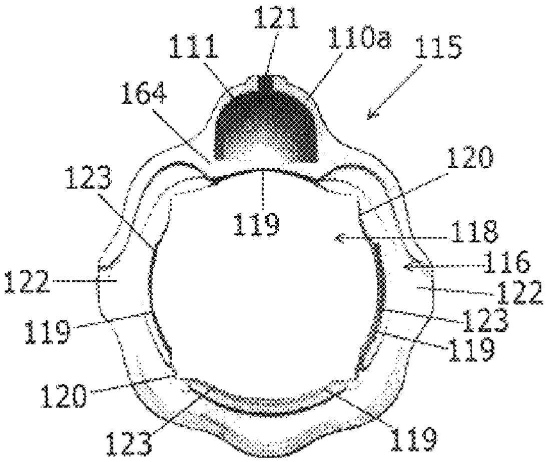
FIG. 8 is a rear view showing the embodiment of FIG. 7.

FIGS. 7 and 8 are front and rear views, respectively, and showing another embodiment of the unitary molded lighting device structure. The unitary structure 115 is comprised of a hooded cover structure 110*a* having a cavity 111 for a light module and a thermostat connecting or attachment ring portion 116 with a plurality of peripheral decorative outer segments 117. FIG. 8 further shows the device cover 110*a* having a decorative element 112 molded on its top. The connecting ring 116 has a centrally disposed opening 118 with beveled interior walls 119 sloping from the front to the rear for engaging the exterior of a thermostat, for example. The ring 116 has finger slots 122 and opposing stop portions 123 to permit the embodiment 115 to be used on an existing thermostat without impeding its functions. The lighting device embodiment 115 is constructed and arranged to be placed about an existing thermostat including its outside cover i.e., a standard LUX thermostat or a Honeywell thermostat, for example. Thus, the embodiment 115 is a multifunctional structure that has a ring 116 structure having a decorative front structure and a rear structure adapted to engage various objects. For example, the tapered corner walls 120 engage a square-like structure and the tapered circular walls 119 engage a circular-like structure. The four opposing stop segments 123 permit the embodiment 115 to be placed over an existing circular thermostat without impeding any functions. The structure 115 may also be attached to a circular or square shaped base which may be mounted on a door, for example. The cover structure 110*a* is similarly constructed as previously described to receive the unitary lighting base units or lighting modules of the invention. The cavity 111 defined by the cover 110*a* and a bottom ridge member 164 provides the space within which the internal lighting module may be frictionally held. The rear of the device cover 110*a* is shown to have a slot 121, to receive the switch actuator of the various lighting modules shown and described.

Figure 9:
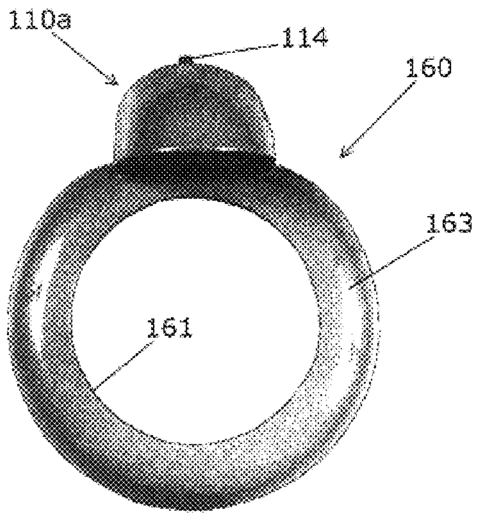
FIG. 9 is a front view showing another embodiment of the unitary molded lighting device of the invention.
Figure 10:
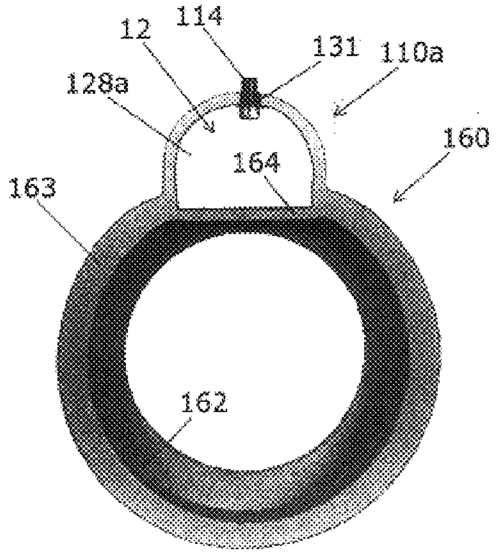
FIG. 10 is a rear view of the embodiment of FIG. 9.

FIGS. 9 and 10 show another embodiment 160 of a thermostat cover ring lighting device. The cover ring embodiment 160 has a cover ring structure 163 with an inner opening 161 and a rear opening 162 to replace a standard thermostat cover. The lighting device cover 110(*a*) is shown molded with the cover ring 163 and a bottom ridge 164 is disposed in the rear of the embodiment 160 to frictionally receive the base structure 128(*a*) having the internal lighting structure including the momentary switch 114 which is shown extending through slot 131 in the rear of the lighting cover.

The lighting devices of FIGS. 1–4 when used with a thermostat may be rotatable 360° about or along with the ring cover to thereby direct light onto any desired portion of a thermostat. Thus, although the lighting devices are shown in the 12 O'Clock position with respect to the thermostat, the rotation of ring 37 having the lighting device 10 mounted thereon, through a 360° rotation, will direct light to any desired area. Regarding ring 24, the lighting device 10 may be moved thereon 360°. Other lighting devices described herein may be similarly moved or adjusted with respect to an appliance. The lighting devices and other embodiments of the device may be painted or molded of any desired color or to have a distinctive, decorative color and/or logo for advertising and promotional purposes.

Figure 11:
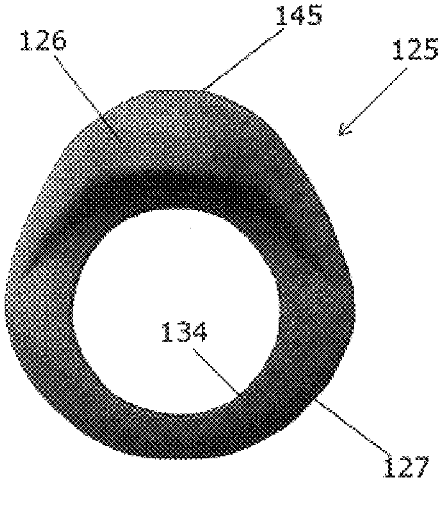
FIG. 11 is a front view showing another embodiment of the lighting device of the invention.
Figure 12:
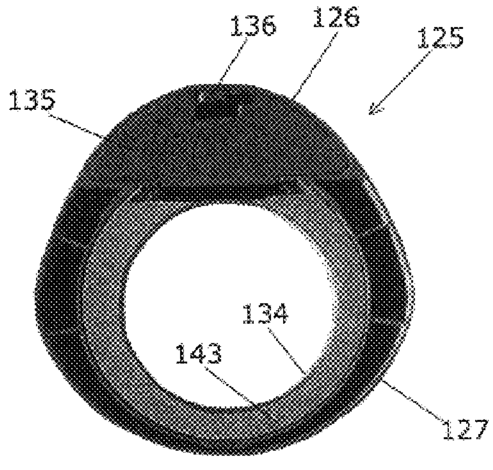
FIG. 12 is a rear view of the lighting device embodiment of FIG. 11.
Figure 13:
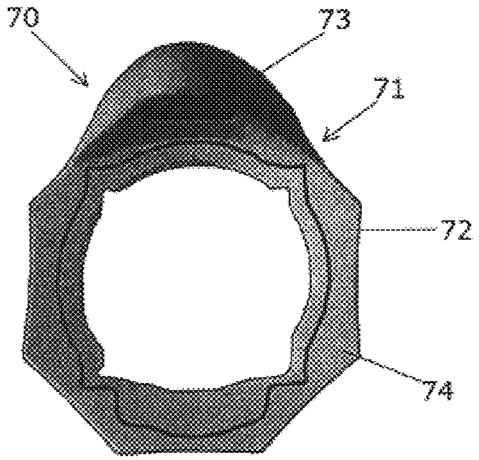
FIG. 13 is a front view showing another embodiment of the lighting device of the invention.
Figure 14:
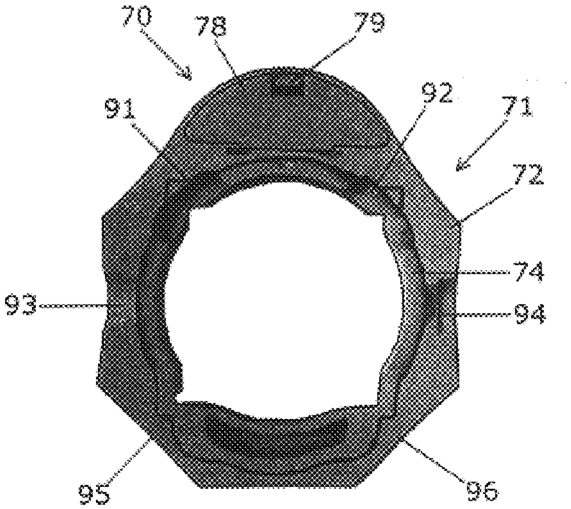
FIG. 14 is a rear view of the lighting device embodiment of FIG. 13.
Figure 15:
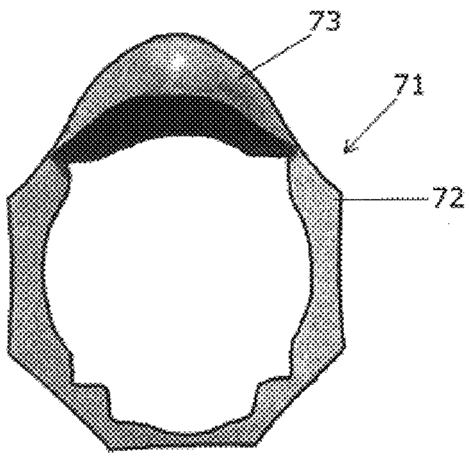
FIG. 15 is a front view of the lighting device of FIG. 13 and having the adapter structure removed.
Figure 16:
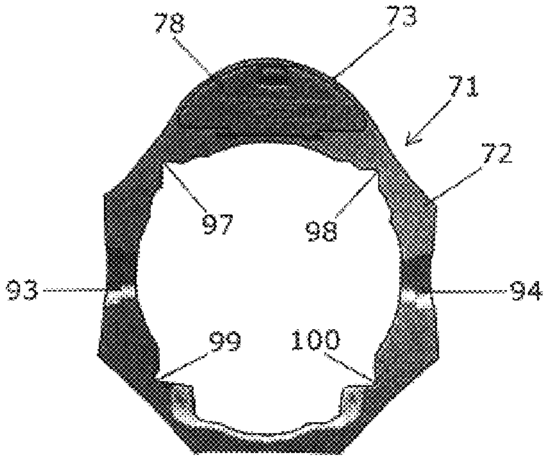
FIG. 16 is a rear view of the lighting device embodiment of FIG. 15.

Referring to FIGS. 11 and 12, a lighting device embodiment 125 is shown comprised of a unitary hooded light member and an attachment ring. The embodiment 125 is shown having a hood member 126 and attachment ring member 127. The hood member 126 has an activating button 145 and a rear cover 135 with latch 136 which is part of and which provides access to the electrical components, as described with respect to lighting module 16, for example. The attachment ring 127 includes an opening 134 and inner ring 143 is provided to frictionally engage a thermostat. The attachment ring member 127 is shown to have a hollow interior with ribs so as to reduce material usage.

Figure 24:
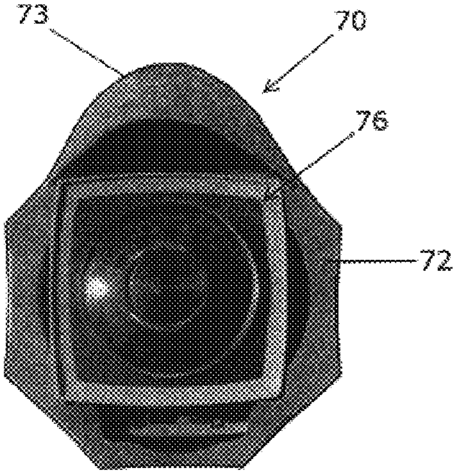
FIG. 24 is a front view showing the lighting device of FIG. 15 mounted on a different thermostat structure.
Figure 25:
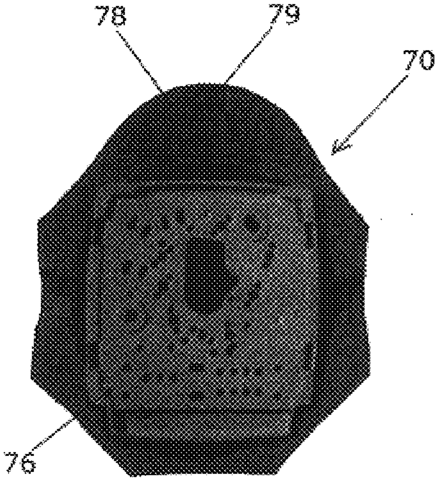
FIG. 25 is a rear view thereof.
Figure 26:
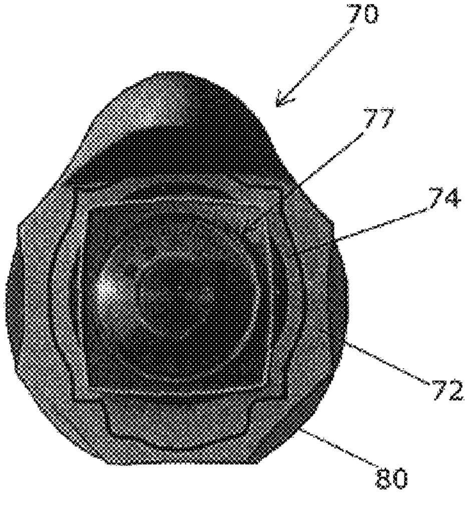
FIG. 26 is a front view showing the lighting device of FIG. 13 mounted on another thermostat structure.

Referring to FIGS. 13–19, a thermostat lighting device 70 is shown comprising an integral hooded light member and attachment member 71 having an upper hooded body 73 and an attachment ring body 72. An adapter structure 74 is shown positioned within the inner boundary of the ring body 72. The hooded body 73 has a rear cover portion 78 which is part of the lighting module that fits within the rear portion of the hood body 73 and which may be secured therein by latch 79. The ring body 72 is shown to have tapered corner walls 97, 98, 99 and 100 and relief areas or cavities 95 and 96 for mounting onto a thermostat 76 as shown in FIGS. 24 and 25. Notches 93 and 94 are shown in the side portions of ring body 72 and which provide finger grips for removal of the of the lighting device 70 from a thermostat.

Figure 17:
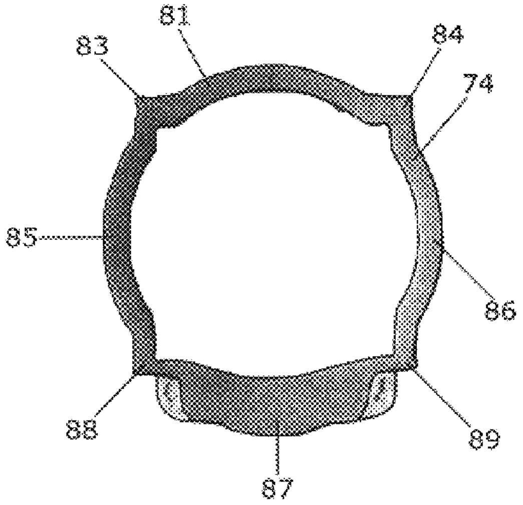
FIG. 17 is a front view of the adapter structure of the lighting device of FIG. 13.
Figure 18:
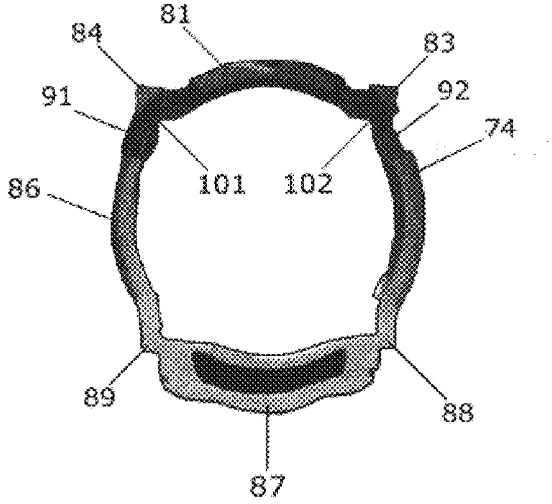
FIG. 18 is a rear view of the adapter structure of FIG. 17.
Figure 19:
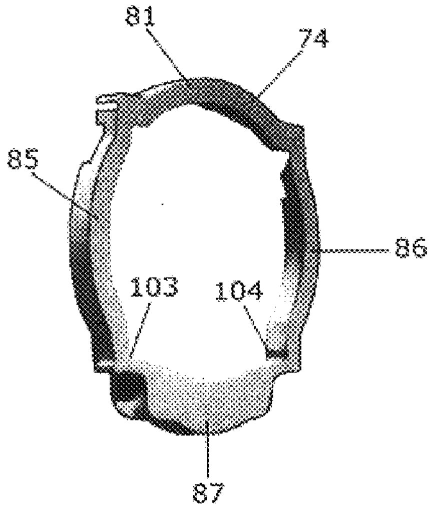
FIG. 19 is a perspective view thereof.
Figure 20:
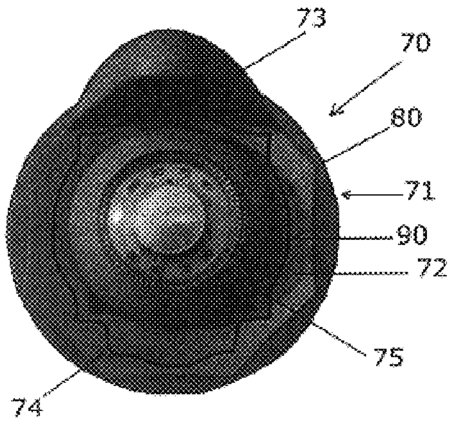
FIG. 20 is a front view showing a thermostat structure having the lighting device of FIG. 13 mounted thereon.
Figure 21:
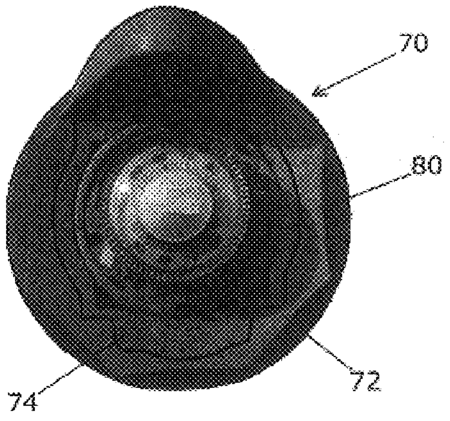
FIG. 21 is a front view of the thermostat structure of FIG. 20 having the cover removed.
Figure 22:
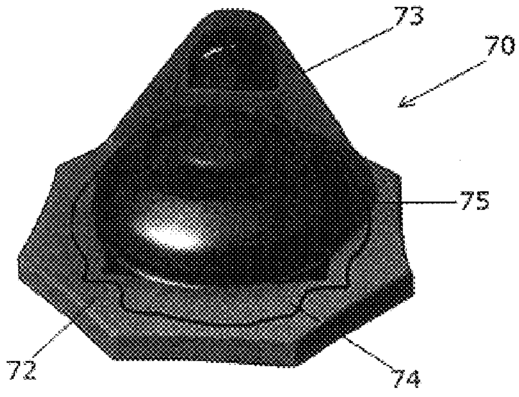
FIG. 22 is a perspective view showing the lighting device of FIG. 13 mounted on a thermostat.
Figure 23:
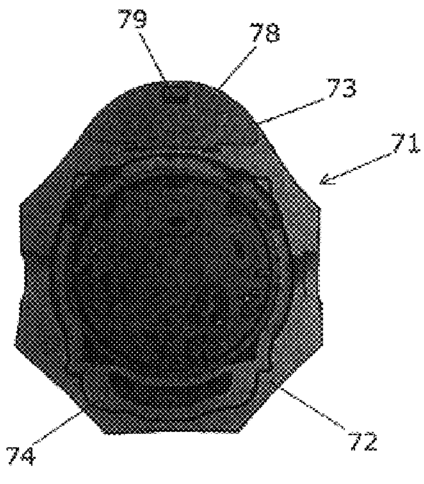
FIG. 23 is a rear view of the lighting device of FIG. 13 mounted on a thermostat.

FIGS. 17–19 show the adapter structure 74 which is constructed and arranged to permit the lighting device embodiment 70 to be used with three different thermostat models, i.e., a Honeywell T-87, a Lux T 201141 and a Lux T 401143. The lighting device 70 and the adapter structure 74 is shown used with respect to various thermostats in FIGS. 20–26. The adapter structure 74 is shown to have a top member 81, side members 85 and 86, a bottom member 87 and corner portions 83, 84, 88 and 89. Tapered inner corner walls 101, 102, 103 and 104 are provided to engage a Lux '141 thermostat shown as thermostat 77 in FIG. 26. Relief areas or cavities 91 and 92 are provided for the heat/cool/fan levers for a Honeywell thermostat. The lighting device 70 is shown mounted on a thermostat 75 with wall cover-up plate 80 structure in FIGS. 20 and 21. An expansion gap 90 is shown between the adapter structure 74 and the ring body 72. The expansion gap 90 provides a slight opening between the outside edge of adapter 74 and the inside edge of ring body 72. The expansion gap 90 permits the adapter 74 to be flexibly expanded outwardly to thereby frictionally engage the base of thermostat 75, for example. This feature is provided because thermostats have been found to have slightly varying base diameters and to provide for base structures that may have been painted.

Figure 27:
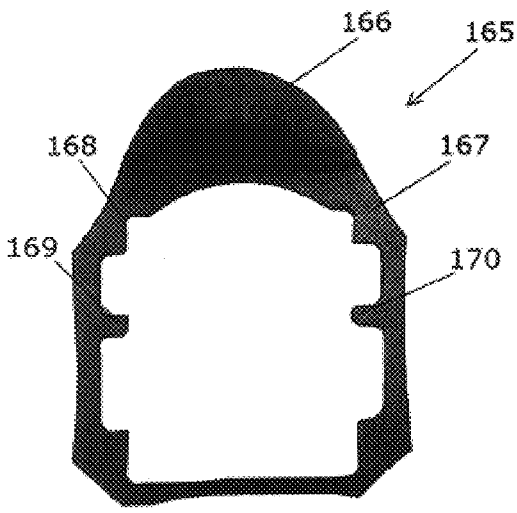
FIG. 27 is a front view of another embodiment of a lighting device of the invention.
Figure 28:
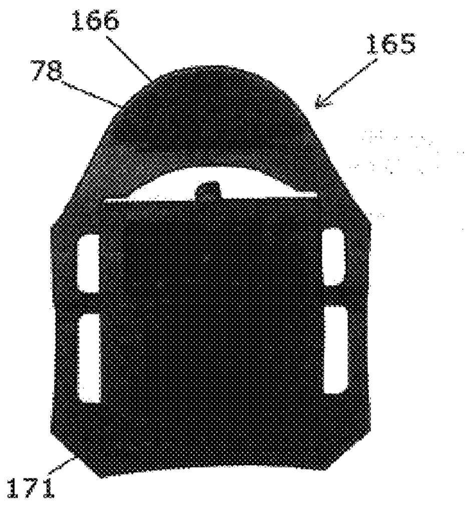
FIG. 28 is a rear view of the lighting device of FIG. 27 mounted on a thermostat structure.
Figure 29:
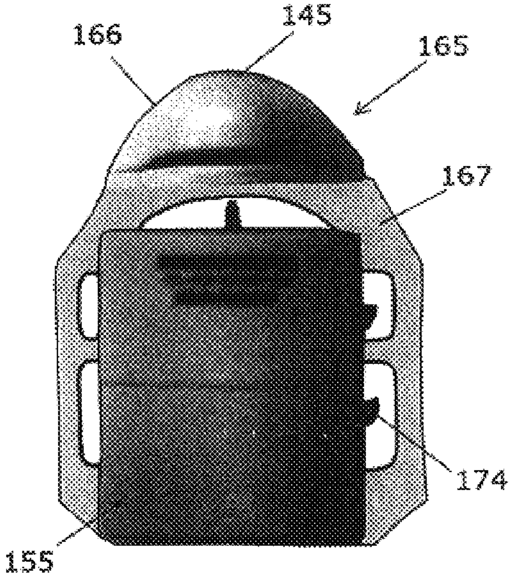
FIG. 29 is a front view of the lighting device of FIG. 27 mounted on a different thermostat structure.
Figure 30:
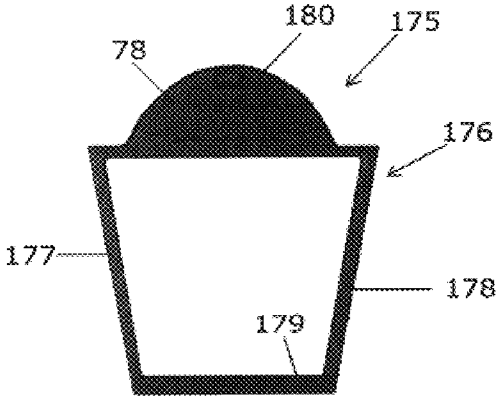
FIG. 30 is a rear view of another lighting device of the invention.

Referring to FIGS. 27–29, a lighting device embodiment 165 is shown comprised of a unitary structure having a hood body 166 and attachment body member 167 for engaging different thermostat models, i.e., a Robert Shaw thermostat model CM84, a Lux T101143 and a Lux T101141. The body member 167 has four corners 168 and inwardly extending members 169 and 170 to engage and be held to the thermostat 171 or 155 and which further provides open spaces for levers 174 of the thermostat to be accessible.

Figure 31:
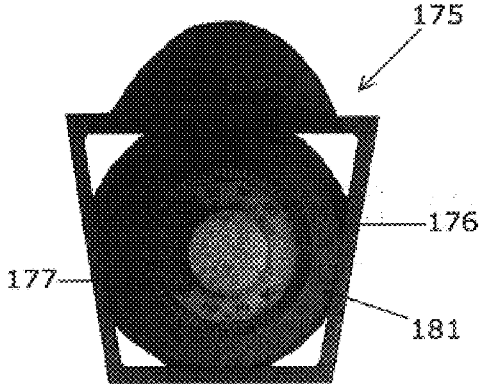
FIG. 31 is a front view of the lighting device of FIG. 30 mounted on a thermostat.
Figure 32:
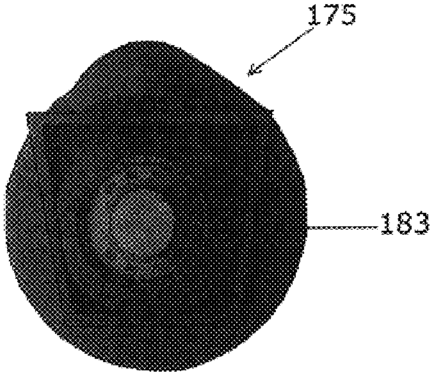
FIG. 32 is a front view of the lighting device of FIG. 30 mounted on another thermostat structure.
Figure 33:
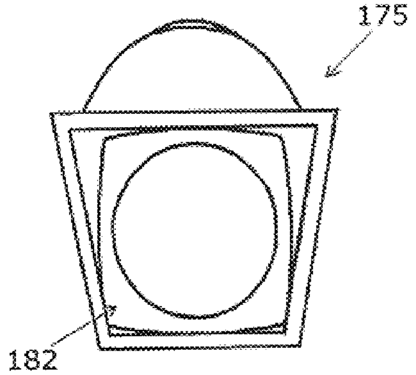
FIG. 33 is a front view of the lighting device mounted on another thermostat structure.

Referring to FIGS. 30–33, a lighting device 175 is shown having a unitary structure comprising light hood member 180 and attachment member body 176. The attachment member 176 is shown to have a trapezoidal configuration having side members 177 and 178, a bottom member 179 and a top member to which the hooded light member is shown integrally mounted. Light hood 180, however, may be mounted on any of the side members 177 or 178 or bottom member 179 of attachment member body 176. The body members are preferably semi-rigid in construction, i.e., of a plastic composition, to thereby enable the lighting device 175 to engage an appliance, such as a thermostat, for momentary lighting purposes. FIG. 31 shows the lighting device 175 mounted to thermostat 181, FIG. 32 shows the lighting device 175 mounted to a thermostat structure having a wall cover plate 183 and FIG. 33 shows the lighting device 175 mounted to a thermostat 182. The trapezoidal configuration, the positioning of the hooded member and the flexibility of the body members of the lighting device 175 allows the lighting device to be mounted to a variety of appliance configurations.

Figure 34:
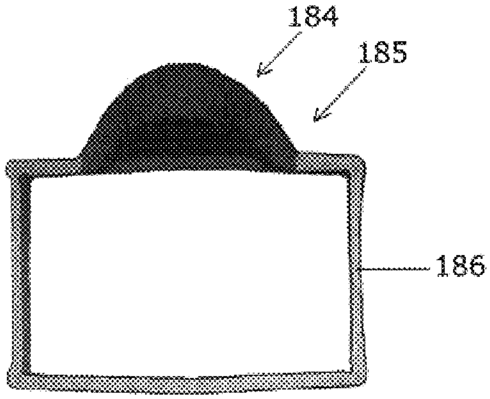
FIG. 34 is a front view of another lighting device of the invention.
Figure 35:
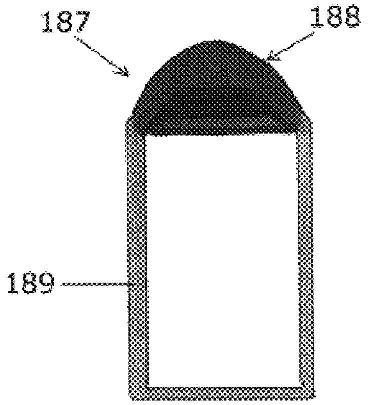
FIG. 35 is a front view of another lighting device of the invention.

FIGS. 34 and 35 respectively, show lighting devices 184 and 187. Each device shows a hooded body 185 or 188 attached to a rectangular attachment member 186 or 189. Hooded body 185 or 188 may be attached to any leg of rectangular attachment member 186 or 189. As will be further shown and described, the hooded body may be unitarily molded with the rectangular attachment body or may be mounted for removal from the rectangular attachment body structure. Each attachment body member preferably has semi-rigid or flexible leg members which permit the lighting device to be mounted onto an appliance whereby the forward extended hood allows light to be directed to a predetermined area. Although circular, trapezoidal and rectangular attachment structures have been shown and described herein, any geometric shape attachment structure may be used within the purview of this invention.

Figure 36:
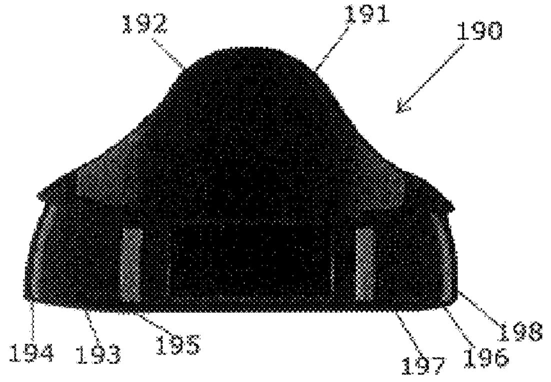
FIG. 36 is a bottom view of a lighting device showing an attachment structure thereof.
Figure 37:
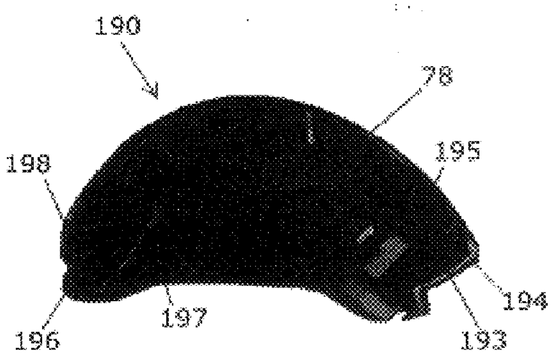
FIG. 37 is a perspective view showing the rear and bottom of the lighting device of FIG. 36.
Figure 38:
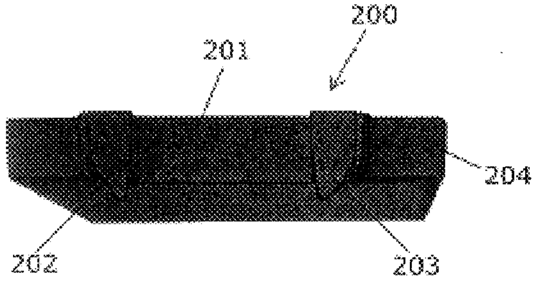
FIG. 38 is a top view showing a mounting structure on an appliance attachment member for receiving and holding the lighting device of FIG. 36.
Figure 39:
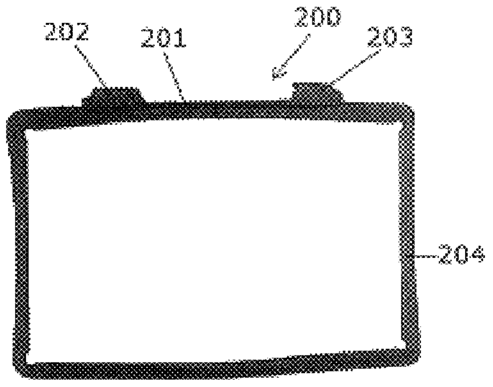
FIG. 39 is a front view of the structure of FIG. 38.

FIGS. 36 and 37 show a lighting device embodiment 190 having an attachment structure which permits the lighting device to be removably mounted on a cooperating mounting structure, as shown in FIGS. 38 and 39, for example. The lighting device 190 is shown to have a forward hood 191 having a lens 192 for protecting a light source thereabove. An attachment structure is shown comprised of two tapered slide members 193 and 196 which are incorporated into the bottom of body member 190. Slide member 193 has opposing tapered edges 194 and 195 and slide member 196 has opposing tapered edges 197 and 198. As shown in FIGS. 38 and 39 a mounting structure 200 is shown comprised of a body member 201 having upwardly extending cooperating tapered slide members 202 and 203 for mating engagement with slide members 193 and 196 of the lighting device 200. The mounting structure 200 may be positioned on a thermostat structure or other appliance, may be originally molded into a thermostat structure or appliance or may be attached or molded into an attachment member 204 which is constructed and arranged to frictionally fit about an appliance, such as a thermostat.

Figure 40:
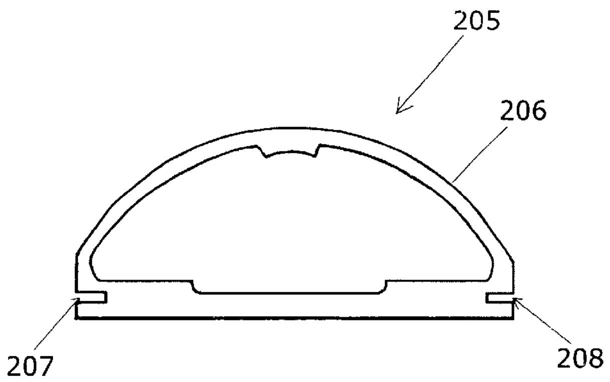
FIG. 40 is a rear view of a lighting device having another attachment structure.
Figure 41:
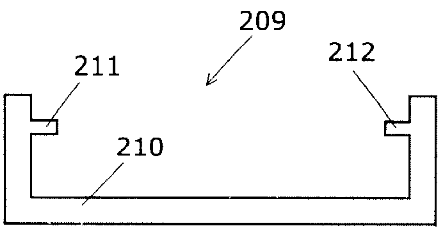
FIG. 41 is a mounting structure for receiving the lighting device of FIG. 40.
Figure 42:
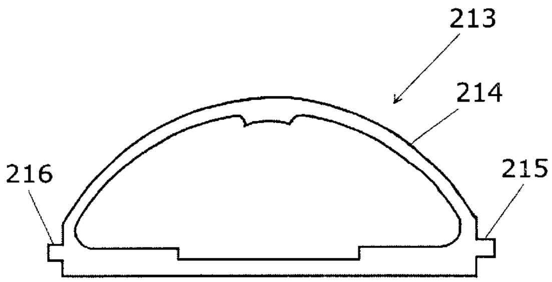
FIG. 42 is a rear view of a lighting device having another attachment structure.
Figure 43:
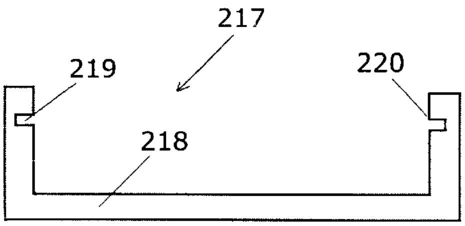
FIG. 43 is a mounting structure for receiving the lighting device of FIG. 42.
Figure 44:
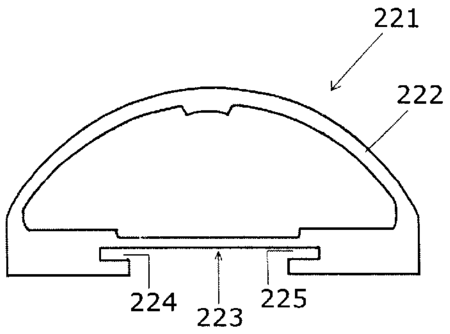
FIG. 44 is a rear view of a lighting device having another attachment structure.
Figure 45:
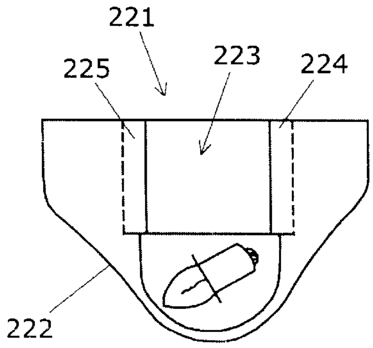
FIG. 45 is a bottom view of the lighting device of FIG. 44.
Figure 46:
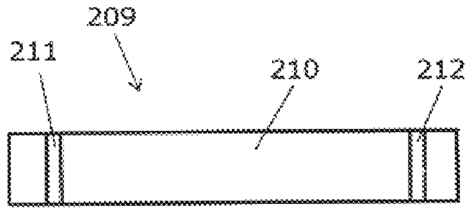
FIG. 46 is a top view of the mounting structure of FIG. 41.
Figure 47:
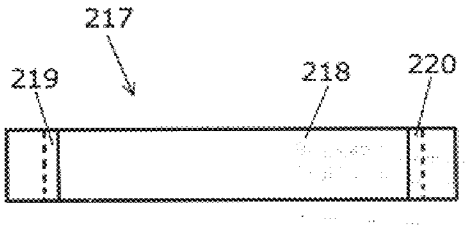
FIG. 47 is a top view of the mounting structure of FIG. 43.
Figure 48:
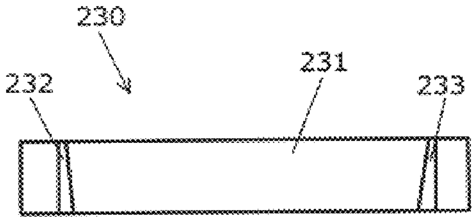
FIG. 48 is a top view of another mounting structure for a lighting device.
Figure 49:
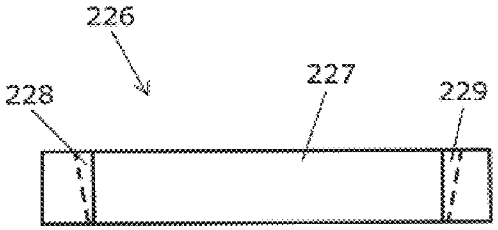
FIG. 49 is a top view of another mounting structure for a lighting device.
Figure 50:
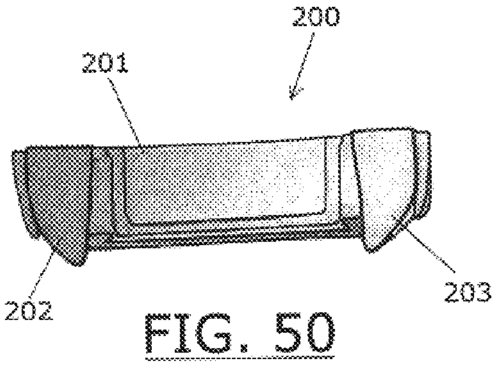
FIG. 50 is a top view of another mounting structure for a lighting device.
Figure 51:
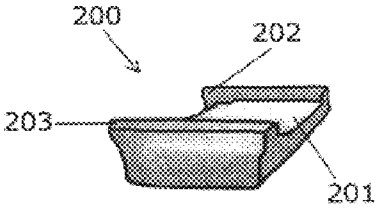
FIG. 51 is a is a perspective view of the mounting structure of FIG. 50.

Referring to FIGS. 40–51, a number of lighting devices and cooperating mounting members are shown. FIG. 40 shows a lighting device 205 having a hooded body 206 and a bottom portion having laterally extending slide slots 207 and 208. A mounting member 209 is shown in FIG. 41 having a body member 210 and interiorly extending slide extensions 211 and 212 which are constructed and arranged to receive the slide slots 207 and 208 of the lighting device 205. FIG. 46 is a top view of the mounting member 209 and which may be molded into or secured to an appliance structure. Although the bottom of the mounting member 209 is shown to be flat, any contour may be utilized to match the contour of an appliance. FIG. 42 shows lighting device 213 having a hooded body 214 with a bottom having slide extensions 215 and 216 which are constructed and arranged to engage the internally disposed slide slots 219 and 220 in body member 218 of mounting member 217, a front view of which is shown in FIG. 43 and a top view of which is shown in FIG. 47. FIGS. 44 and 45 show a lighting device 221 having a hooded body 222 having an attachment member 223 internally disposed on its bottom and comprised of internal slide slots 224 and 225. The slot 223 is constructed and arranged to receive an elevated plate-like member of a mounting structure which is adapted for securement to an appliance, for example. As further shown in FIGS. 48–51, a mounting structure 230 having a body member 231 and slide structures 232 and 233 may be used with a lighting device having cooperating slide members. Further, a mounting structure 226 having a body member 227 and slide structures 228 and 229 may be utilized to hold a cooperating lighting device. The mounting structure 200 of FIGS. 50 and 51 as previously shown incorporated in the attachment member 204 of FIGS. 38 and 39 may be provided for placement onto other attachment members or incorporated into the body of the appliance itself to thereby receive the lighting device 190 of FIGS. 36 and 37.

Figure 52:
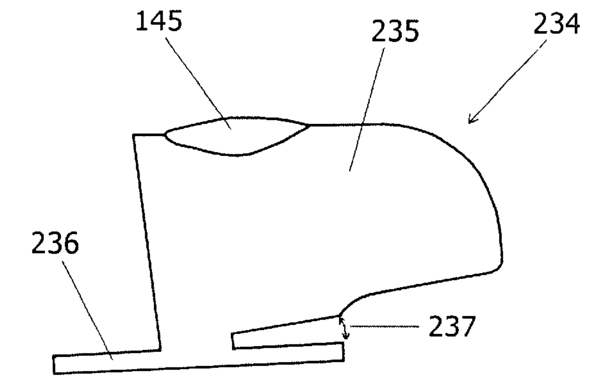
FIG. 52 is a side view of another lighting device having an attachment structure.
Figure 53:
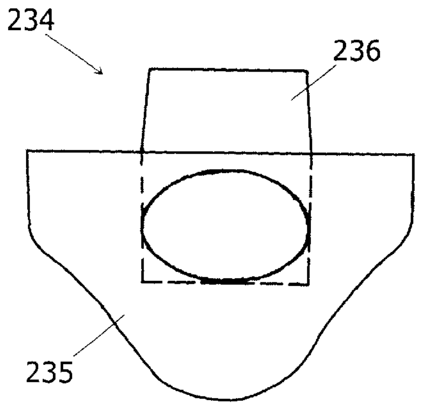
FIG. 53 is a top view of the lighting device of FIG. 52.
Figure 54:
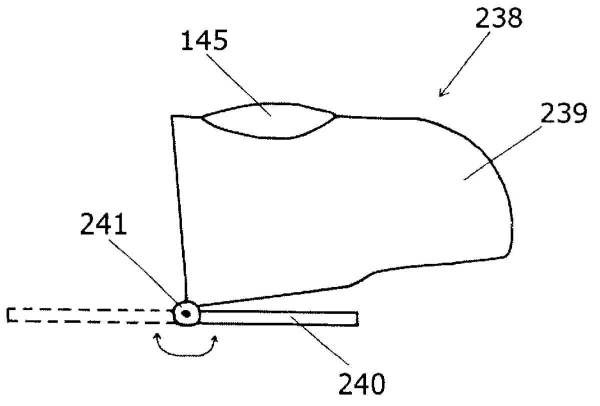
FIG. 54 is a side view of a lighting device having another attachment structure.
Figure 55:
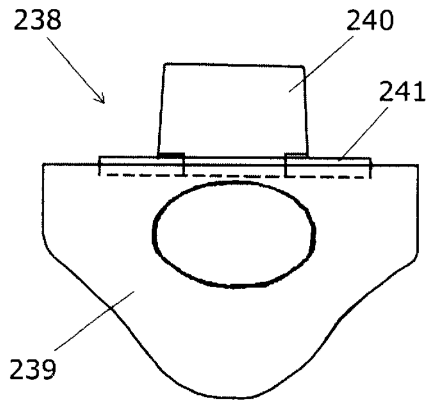
FIG. 55 is a top view of the lighting device of FIG. 54.
Figure 56:
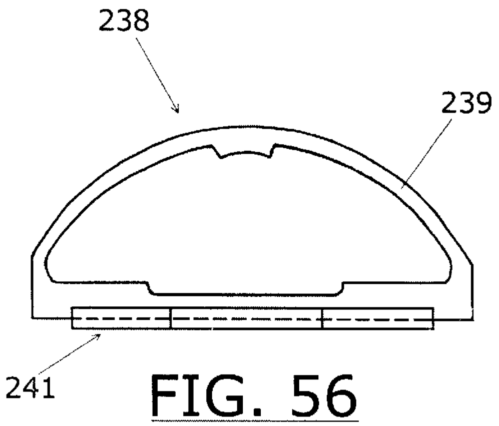
FIG. 56 is a rear view of the lighting device of FIG. 54.

FIGS. 52 and 53 show lighting device 234 having a hooded body member 235 and an attachment structure 236 on the bottom thereof. As shown, the attachment structure 236 may be at an angle 237 with respect to the body member 235. As further shown in FIGS. 54–56, a lighting device 238 may have a pivotable attachment structure 240 mounted on the bottom of hooded body member 239. A hinge 241 is provided whereby the attachment structure may be disposed at any angle with respect to an appliance. Thus, a fixed angle with regard to embodiment 234 or an adjustable angle with regard to embodiment 238 may be provided for the attachment member of the lighting device.

Figure 57:
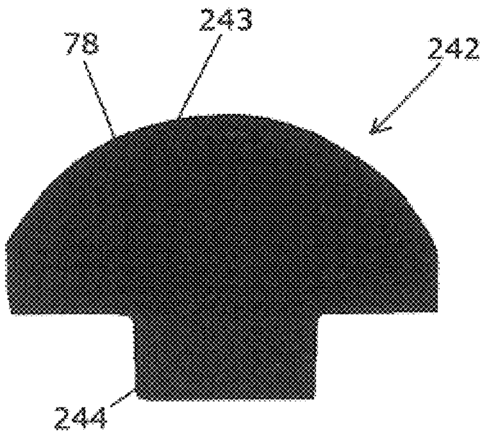
FIG. 57 is a rear view of a lighting device having another attachment structure.
Figure 58:
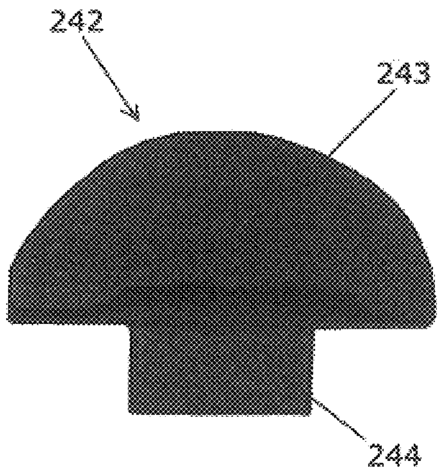
FIG. 58 is a front view of the lighting device of FIG. 57.
Figure 59:
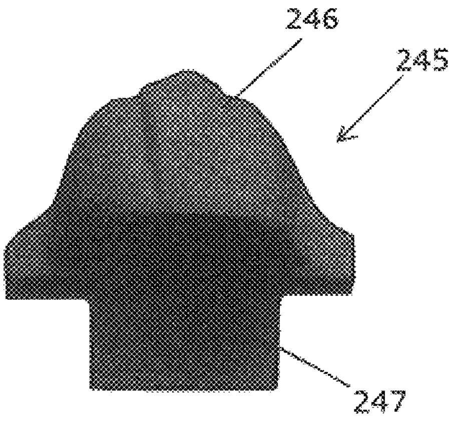
FIG. 59 is a front view of a lighting device having another attachment structure.
Figure 60:
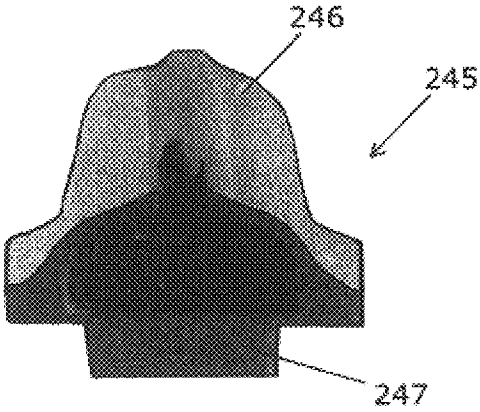
FIG. 60 is a rear perspective view of the lighting device of FIG. 59.
Figure 61:
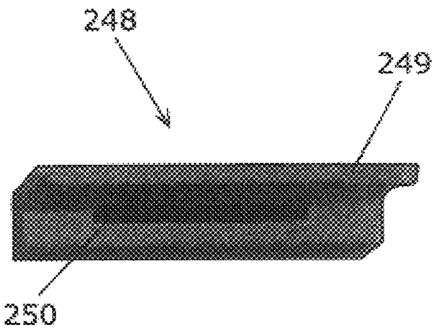
FIG. 61 is a top view of a mounting structure for a lighting device.
Figure 62:
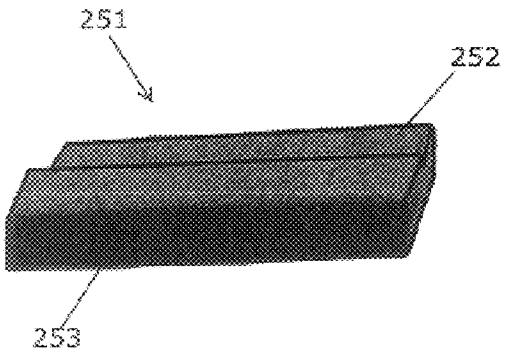
FIG. 62 is a bottom view of a mounting structure for a lighting device.
Figure 63:
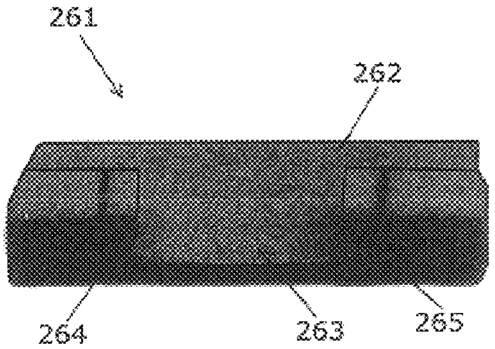
FIG. 63 is a perspective view of a mounting structure for a lighting device.
Figure 64:
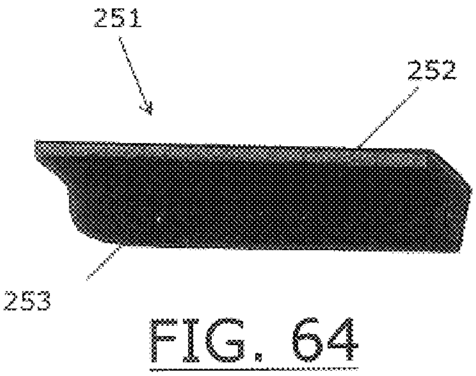
FIG. 64 is a top perspective view of the mounting structure of FIG. 62.
Figure 65:
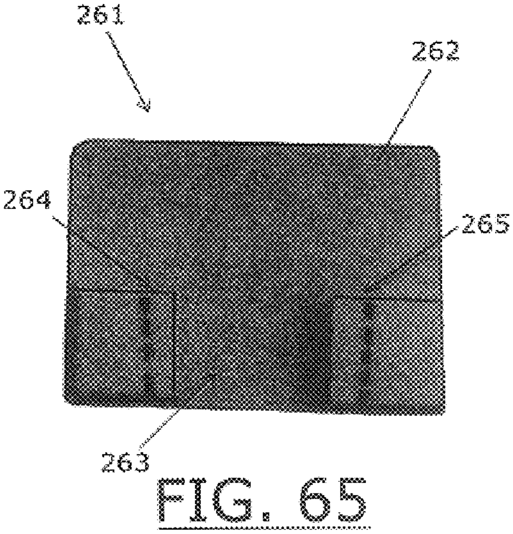
FIG. 65 is a front view of the mounting structure of FIG. 63.

FIGS. 57 and 58 show a lighting device 242 having an attachment structure 244 extending downward from the rear of the hooded body structure 243. FIGS. 59 and 60 show lighting device 245 having a downwardly extending attachment structure 247 from the rear of the hooded body member 246. The attachment members 244 and 247 may be rectangular, tapered or of another configuration. FIGS. 61–65 show mounting structures for use with the downwardly extending attachment members of the lighting devices. The mounting structure 248 is shown in FIG. 61 to have a body member 249 with a slot 250 for receiving the downwardly extending attachment member of a lighting device. FIGS. 62 and 64 show mounting structure 251 having a slot 253 in body member 252. FIGS. 63 and 65 show mounting structure 261 having a body member 262 having a slot 263 defined by internal side slots 264 and 265. The internal slots may be straight or angled to receive a mating attachment leg or member of the lighting device. The body members of the mounting structures may be fastened by any known means to, on or near an appliance and may be constructed out of a flexible material to permit the mounting structures to be attached to a variety of surface shapes.

Figure 66:
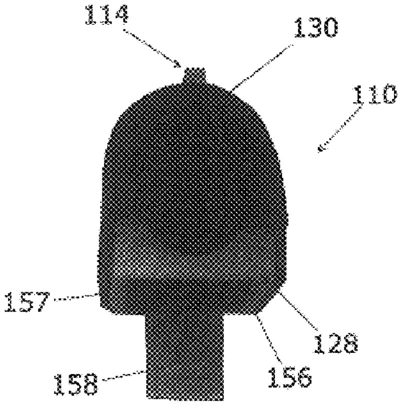
FIG. 66 is a front perspective view of another lighting device having an attachment structure.

FIG. 66 shows a front view of lighting device 110 having a hooded body 130 containing interior base member 128. The base member 128 has a flat bottom 156 having an adhesive layer 157 and release liner 158 for attachment to any desired flat surface, for example. Switch 114 extends from the device outer cover body 130 and which is shown to have flat bottom sides. Alternatively, the hooded body 130 may have a bottom portion as shown with respect to other lighting device embodiments. In the latter structure, the attachment means may be placed on the bottom of the hooded body.

Referring to FIG. 66 and FIGS. 54–56, the plate-like attachment member 240 and the hinge member 241 may be attached to the rear of the base member 128 or to the rear of cover 130 of FIG. 66. Alternatively, the cover 130 may have a bottom portion and to which the attachment member and hinge member may be connected. Further, instead of having a plate-like attachment member 240 connected to the hinged base member, to the cover structure or to the bottom of the cover structure, a ring-like attachment member, as described herein, may be connected to the bottom of the hinge. In the latter embodiments, the ring-like attachment member may be mounted to an appliance and the hooded lighting structure would be pivotable with respect thereto.

Figure 67:
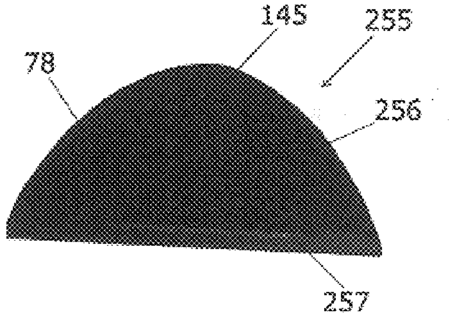
FIG. 67 is a rear view of another lighting device.
Figure 68:
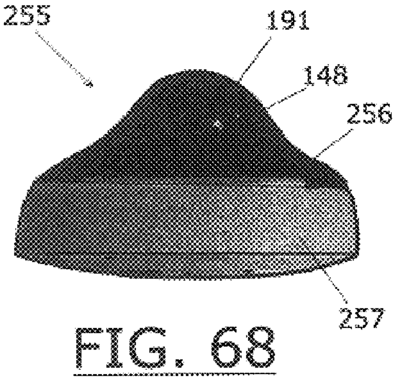
FIG. 68 is a bottom view of the lighting device of FIG. 67.
Figure 69:
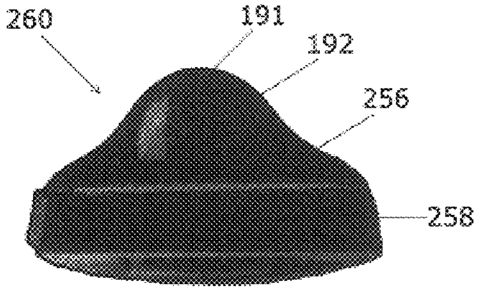
FIG. 69 is a bottom view of another lighting device having an attachment structure.

FIG. 67 shows a lighting device 255 having a hooded body 256 with an activating button 145, a rear cover 78 and a bottom 257. The bottom 257 as shown is flat and may be secured to, on or near an appliance and the bottom may be of any contour to mate with an appliance, an appliance structure or a mounting structure. The bottom portion 257 may also include a front lip member to position the lighting device with respect to an appliance. FIG. 68 shows the forward hood 191 having the light source 148 positioned therein. A suitable adhesive, an adhesive pad, or other attachment means as known in the art may be used to secure the lighting device of FIG. 68. FIG. 69 shows a lighting device 260 having lens 192 in hood 191 and an adhesive strip with release liner 258 for a securement member of the device 260.

Figure 70:
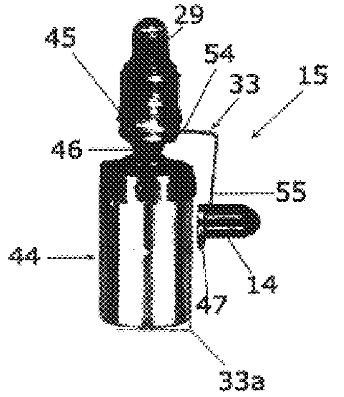
FIG. 70 shows an electrical lighting component arrangement used in a lighting module for a lighting device.
Figure 71:
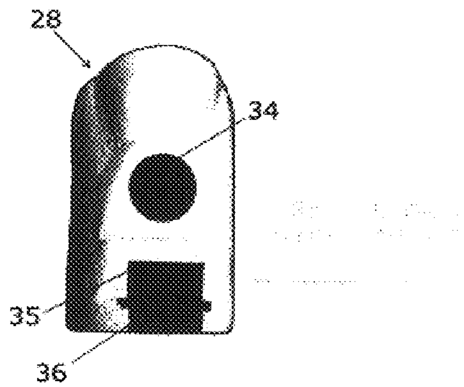
FIG. 71 is a top view of the base or carrier structure for the electrical components of FIG. 70.

FIG. 70 shows an electrical lighting structure 15 which is held in the base member 28 of FIG. 71. The conductive connector member 33 provides the structural support and connection between the bulb 29, battery 44, and switch 14 and is shown to have a generally L-shaped configuration having legs 54 and 55. The switch 14 is shown attached by a fastener 47, such as a screw, to leg 55 of conductive connector 33. The light bulb 29 is shown screwed into internally threaded socket area 45 on the adjoining leg 54 of conductive connector strip 33 to expose bulb contact end 46. A battery 44 is also shown and which is placed within the cavity of base structure 28. Upon placement of these components within base structure 28, the light bulb 29 is threaded through socket area 45 to secure the battery 44 within the cavity of base structure 28. The downward movement of switch 14 contacts the conductive side of battery 44 which completes the circuit causing light bulb 29 to illuminate. The release of switch 14 opens the circuit as a result of the inherent spring-like properties of the conductive connector strip 33. Alternatively, a conductive connector member may extend from the rear of the battery and to below the switch 14. The latter conductive connector member may be used if the battery 44 has a non-conductive side wall.

The light bulb 29 used in the internal lighting structure is preferably a premium grade 2.25 volt, 0.25 amp bulb although other bulb or light source specifications, i.e., an LED (light emitting diode), may be utilized within the purview of this invention depending upon lighting requirements or the battery or power source type. The battery 44 may be any suitable battery or batteries, for example a 3 volt, 750 mah lithium battery and the conductive connector member(s) 33 are preferably phosphorous bronze strips having a thickness range of approximately 0.006 to 0.014 inches and having a width of approximately 0.5 inches. The conductive connector strip 33 is bent into a predetermined L-shape which is secured into the slots of the base member 28 and communicates with the battery 44 and bulb 29. The phosphorous bronze member(s) 33 have been found to provide the proper electrical conductivity, physical strength, flexibility, and resilience required for use in the lighting device 10. However, as known by those skilled in the art, other bulb and light source types, batteries, i.e., batteries in series, and conductive members may be used within the purview of this invention.

FIG. 71 shows base structure 28 which preferably is constructed of a nonconductive molded plastic material, i.e., urethane or the like. The base structure 28 may be injection molded and may have various apertures, an internal cavity and aligned slots. The bottom 56 of the base 28 has a predetermined shape to mate with the appliance surface on which the lighting device is mounted, i.e., flat or contoured. The base structure 28 is further shown to have a top aperture 34, front opening 35 and slot 36 which extends from the edges of the opening 35 and into the bottom of the base structure 28. Aperture 34 of base structure 28 allows switch 14 to extend through the base structure 28. Opening 35 and slot 36 of opening 35 hold conductive connector member 33 and light bulb 29 in base structure 28. The opposing snap ridges 42 and 43 of the base structure 28, as shown in FIG. 4, may secure base structure 28 of the light module unit to thermostat cover ring 37. The base structure 28 with the electrical components is constructed to fit under of the cover member 30.

Figure 72:
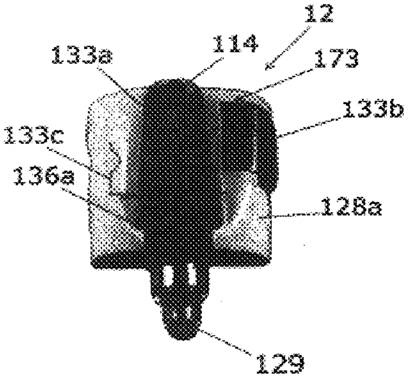
FIG. 72 is a top view of another lighting module for a lighting device.
Figure 73:
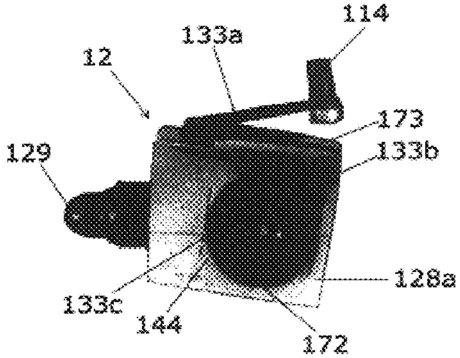
FIG. 73 is a side view of the lighting module of FIG. 72.

Referring to FIGS. 72 and 73, embodiment 12 of the internal light unit or module which includes the base structure 128*a* is shown. It is within the purview of this invention to utilize the unitary, slip-in base 128*a* into a variety of lighting device structures. Base structure 128*a* is designed to cooperate and to be frictionally held in place in the cover of the lighting device. Base structure 128*a* is generally a hemispherical structure in cross-section having a plurality of apertures and front and rear flat surfaces. The light bulb 129 extends from base structure 128*a*. The slip-in base structure 128*a* is shown to have a two part conductive connector member 133*a* and 133*b* which respectively make contact with each other and illuminate light bulb 129 when switch 114 is depressed. Conductive connector member 133*a* is held in retaining slot 136*a* and conductive connector member 133*b* is held in slot 173. The conductive connector members 133*a* and 133*b* which, when activated by switch 114, illuminate light bulb 129. As shown, strip portion 133*a* is perpendicularly aligned with strip member 133*b* at the top of the base structure 128*a* whereby switch 114 is aligned for contact with member 133*b*. Battery 144 is shown contained in cavity 172. As previously described the battery 144 has a conductive peripheral wall which is used to complete the circuit. Alternatively, the conductive connector member may be comprised of a three part structure, to include conductive connector member 133*c* if the battery does not have a conductive side wall. The conductive connector member 133*c* is also a strip of like construction as the other members discussed. Switch 114 is shown mounted to conductive connector member 133*a* and light bulb 129 is shown extending from base structure 128*a* through the front opening. Switch 114 is shown positioned for downward contact to activate the light source. Also shown is retaining slot 136*a* which retains a downward leg of conductive connector member 133*a*.

The base structure 128*a* holds the components of the internal lighting unit or module including, for example, the conductive connector member 133*a* which may be comprised of legs, although as shown, a leg 133*c* may be utilized depending upon battery structure. A threaded socket area on a leg may retain light bulb 129. Momentary switch 114 is shown attached to one leg by a conductive fastener, for example. Conductive connector member 133*b* may have bent legs. The battery 144 is shown to have a conductive side wall which is important in several embodiments of the lighting device. The conductive connector members may be arranged, however, so that any battery or number of batteries may be utilized.

The electrical lighting structure that may be utilized in the base or holding module structures include a conductive connector member that may have portions that contact the side of a battery to complete the electrical circuit. The power component of these internal lighting structures may use two or more batteries, i.e. 1.5 volt battery cells to provide 3 volts in series. A switch is provided in communication with the conductive connector and the power means. The connector member may be formed of phosphorous bronze strip.

Figure 74:
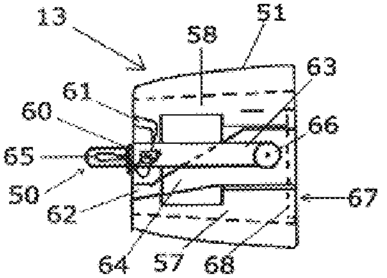
FIG. 74 is a top plan view of another lighting module.

FIG. 74 shows another internal light unit embodiment 50 held in a base member 51 wherein batteries are disposed in a cavity of the molded base and wherein a conductive connector structure may be used to interconnect the batteries, the light source, and switch member 66. A bulb 65 extends from socket 60 which is electrically connected to the positive end of a battery by means of conductive member 61 which extends under conductive strip member 63 and connects to the positive end of the bulb socket 60. Conductive strip member 63 is shown connected to the negative side of the socket 60 and switch plunger 66 is shown mounted at the end of the strip member 63. The switch 66 includes a plunger member and below which a contact protrusion or bend is located. The springy nature of conductive strip 63 provides the momentary operation of the light unit as switch 66 is depressed to contact conductive member or strike pad 64 which has conductive leg 62 that contacts the negative end of battery 58. Rear cover 67 having conductive member 68 on its inside wall retains the ends of batteries 57 and 58. The batteries 57 and 58, therefore, are connected in series and may be N-size batteries (1.5 volt, alkaline batteries). As shown, the batteries are angularly disposed in an internal cavity of the base member 51. As discussed with respect to the other embodiments of the internal light modules of the invention, the base member is preferably molded of a nonconductive plastic material and is tapered in configuration to slip in and be frictionally retained in the end of the lighting device cover structures. Various apertures or openings and retention structures may be used to connect and retain the bulb, power source and switch member in the base member for cooperative use with the cover and hood structures of this invention.

Figure 75:
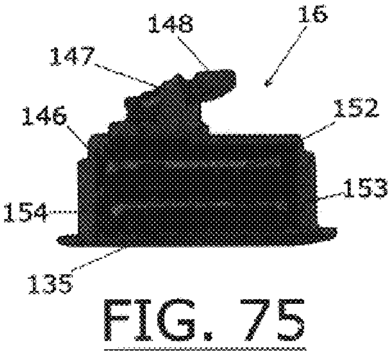
FIG. 75 is a bottom view of another lighting module.
Figure 76:
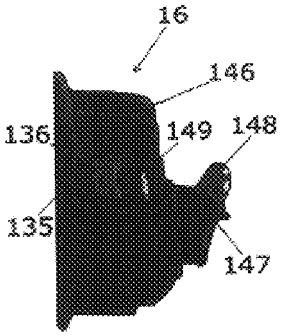
FIG. 76 is a top view of the lighting module of FIG. 75.

Referring to FIGS. 75 and 76, a light module 16 comprising a base structure 146 having a cavity defined by the back cover 135 and wherein batteries 152 and 153 are held. A holder portion 147 secures light source 148 and extends from the front of the base or carrier structure 146. A conductive structure, including member 154 and momentary switch member 149 are shown whereby the placement of the light module 16 within the rear of the lighting hood 126 of the lighting device embodiment 125 of FIG. 12, the light source 148 extends within the front of hood 126 and the activating button 145 is positioned for contact with switch 149.

Embodiments of the lighting devices may be mounted on or near an appliance or incorporated into the appliance or a part of the appliance. For example, regarding thermostats, a hooded lighting device or mounting member may be incorporated into a wall cover-up plate or a thermostat cover. Also, the various mounting or attachment means discussed above may be combined in order to permit the most convenient attachment of a hooded light structure to an appliance. For example, the angled attachment member shown in FIG. 52 may be constructed having opposing snap ridges shown in FIG. 4. The snap ridges can be disposed on the base of a lighting module, as in FIG. 4, or on the hooded cover or attachment member extending from the hooded cover. The opposing snap ridges may be located on either side of the pivotal attachment member to permit attachment of a hooded light structure at a variety of locations and angles.

In summary, the lighting devices of the present invention have various attachment and mounting members for positioning a lighting device for use with appliances, such as thermostats. The attachment and mounting members include replacement cover ring portions, opposing snap ridges, geometric attachment members having openings, cooperating tapered slide members, cooperating slide slot and extension members, angled, fixed and pivotal members with cooperating receiving slots, and adhesive with release liner attachment structures. Attachment members may also use adapters to permit use of one attachment member with several thermostat models. The mounting members may be attached to a thermostat or wall cover-up plate using adhesives, screws or other known means in the art or may be incorporated with a thermostat, thermostat component or wall cover-up plate as a unitary structure.

As many changes are possible to the devices of this invention utilizing the teachings thereof, the descriptions above and the accompanying drawing should be interpreted in the illustrative and not the limited sense.

That which is claimed is:

1. A lighting device comprising:

a) a hooded cover structure having a forwardly extending curved hood and a rear portion;

b) a nonconductive base member constructed and arranged to hold a light emitting source, a power source and a switch, said light emitting source being disposed within said forwardly extending curved hood and said nonconductive member being constructed and arranged for placement in said rear portion of said hooded cover structure; and c) an attachment member being constructed and arranged to position said lighting device to an appliance.

2. The lighting device of claim 1, wherein said cover structure is formed of a molded plastic and wherein said cover structure has a bottom and wherein said attachment member is connected to said bottom of said cover structure.

3. The lighting device of claim 1, wherein said attachment member of said lighting device is constructed and arranged for movement with respect to an appliance whereby said device is able to cast light on any desired portion of the appliance.

4. The lighting device of claim 2, wherein said attachment member is a ring-like member having a decorative front and a rear connecting structure constructed and arranged to frictionally engage an appliance.

5. The lighting device of claim 4, wherein said rear connecting structure of said attachment member includes a tapered surface constructed and arranged to engage an appliance selected from the group of appliances consisting of a thermostat, a thermostat component, a thermostat inner member and a mounting plate.

6. The lighting device of claim 1, wherein said non-conductive base structure has a bottom and wherein said attachment member is positioned on said bottom of said base structure.

7. The lighting device of claim 1, wherein said base structure has a bottom and wherein said attachment member is comprised of opposing snap ridges extending from said base structure bottom.

8. The lighting device of claim 1, wherein said attachment member for securing said lighting device to an appliance comprises said cover structure having a bottom, said cover structure being comprised of a unitary molded structure including a ring-like portion extending from said cover structure bottom, said ring-like portion being constructed and arranged to engage an appliance selected from the group of appliances consisting of a thermostat, a thermostat component, a VCR, a caller ID, and a mounting plate.

9. The lighting device of claim 1, wherein said attachment member is constructed and arranged to engage an appliance selected from the group of appliances consisting of a thermostat, a thermostat component, a thermostat inner member and a mounting plate.

10. The lighting device of claim 1, wherein said cover structure has a bottom and wherein said attachment member for securing said device to an appliance further comprises a ring-like portion extending from said cover structure bottom and a mounting plate constructed to receive said ring-like portion of said cover structure.

11. A lighting device for appliances said device comprising:

a) a base structure having a bottom, a cavity, an aperture, an opening, and a slot in said opening;

b) said cavity in said base structure having means for supporting a conductive connector member, a switch, a light source, and a power means;

c) said switch being positioned on said conductive connector member which provides electrical communication between said light source and said power means, said conductive connector member being positioned in said slot in said opening of said base structure;

d) said switch extending from of said base structure and said light source extending outwardly from said base structure; and e) a cover structure having a forwardly extending hood and being constructed and arranged to receive said base structure whereby said hood extends below said light source, said cover further having an aperture through which said switch is activatable.

12. The lighting device of claim 11, wherein said lighting device has means for securing said device to an appliance, said means being a member of the group of securing means consisting of an adhesive layer with a release liner attached to said bottom of said base structure, opposing snap ridges extending from the base structure bottom, an attachment member connected to said base structure, a unitary molded structure with said cover structure having a bottom and including a ring-like portion extending from said cover structure bottom, said ring-like portion being constructed and arranged to engage an appliance, and an attachment member connected to said bottom of said cover structure.

13. A lighting device for an appliance, said device comprising:

a) a base structure having a bottom and having a cavity therein;

b) a conductive connector member and a switch;

c) a light emitting source extending from said base structure;

d) power source means positioned in said cavity of said base structure and being constructed and arranged to be in communication with said light emitting source;

e) a cover structure having a forwardly extending hood and being constructed and arranged to hold said base structure whereby said hood extends below said light emitting source, said cover further having an aperture through which said switch is accessible for activation; and f) attachment means for securing said lighting device to an appliance.

14. The lighting device of claim 13, wherein said attachment means is a ring-like portion extending from the bottom thereof, said ring-like portion being constructed and arranged to engage an appliance.

15. The lighting device of claim 13, wherein said ring-like portion is of a geometric shape.

16. The lighting device of claim 13, wherein said attachment means is comprised of an adjustable attachment structure.

17. The lighting device of claim 13, wherein said attachment means includes an attachment structure connected to said lighting device and a mounting structure for receiving said attachment structure, said mounting structure being adapted for use with to an appliance.

18. The lighting device of claim 13, wherein said attachment means is selected from the group of attachment structures consisting of an adhesive, snap ridges, an attachment member extending from said base structure, an attachment structure extending from said cover structure, molding said device into an appliance and an attachment member extending from said lighting device having a cooperating mounting structure for an appliance.

19. A lighting device for an appliance comprising:

a) a body member having a forwardly extending hooded member with a downwardly disposed opening, said body member further having a bottom portion and an upwardly disposed opening and a rearwardly disposed opening;

b) a lighting module having a body constructed and arranged for holding a light source, power means and an upwardly extending switch, said switch being aligned for activation with said upwardly disposed opening of said body member, and said light source being disposed in said forwardly extending hooded member; and c) said body member further having means for attachment of said device to an appliance, said means for attachment being positioned at said bottom portion of said body member.

20. The lighting device of claim 19, wherein said means for attachment of said device to an appliance is a member of the group of attachment members consisting of a downwardly extending attachment member from said bottom portion of said hooded body member and having a cooperating mounting member for attachment to an appliance, a downwardly extending adjustable attachment member extending from said bottom of said body member, a slide structure incorporated in said body member and having a cooperating mounting structure, molding the lighting device into an appliance, molding the lighting device into a component of an appliance, an enclosed member having a geometric shape and an opening, and a ring-like portion extending from said bottom of said the lighting device body.

21. The lighting device of claim 19, wherein said body member is formed of a molded plastic or metal material and is constructed and arranged to receive said lighting module through said rearwardly disposed opening.

22. The lighting device of claim 19, wherein said means for attachment is an adjustable structure whereby said device may be moved to any position with respect to an appliance.

23. The lighting device of claim 22, wherein said adjustable structure includes a hinge member.

24. The lighting device of claim 19, wherein said means for attachment includes a slidable engagement member.

25. The lighting device of claim 19, wherein said means for attachment includes a mounting member for cooperating with said means for attachment.

26. The lighting device of claim 25, wherein said mounting member is constructed and arranged for incorporation with an appliance.

27. The lighting device of claim 21, wherein said means for attachment comprises incorporating said lighting device into the structure of an appliance.

* * * * *